Crawley & Baylies.
Vise.
No. 3,883. Reissued Mar. 22, 1870.
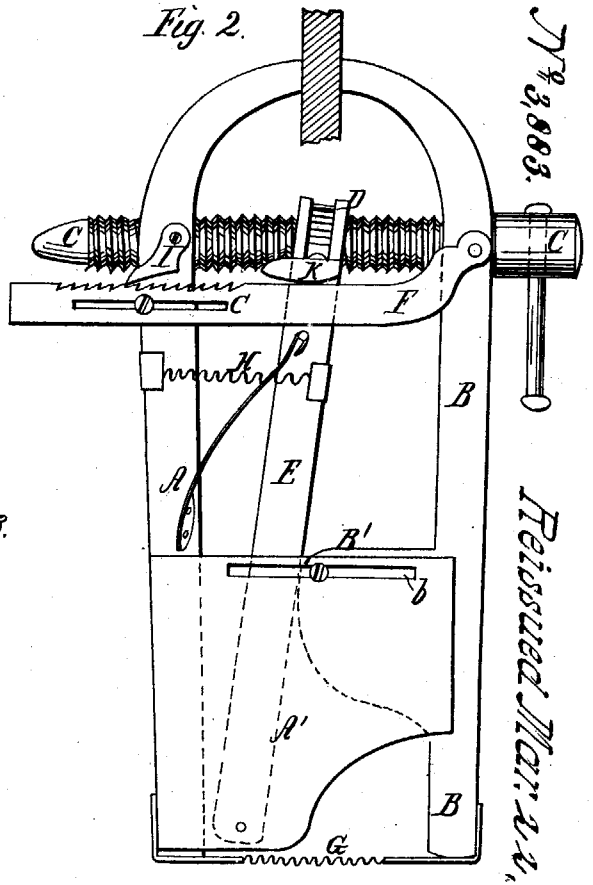
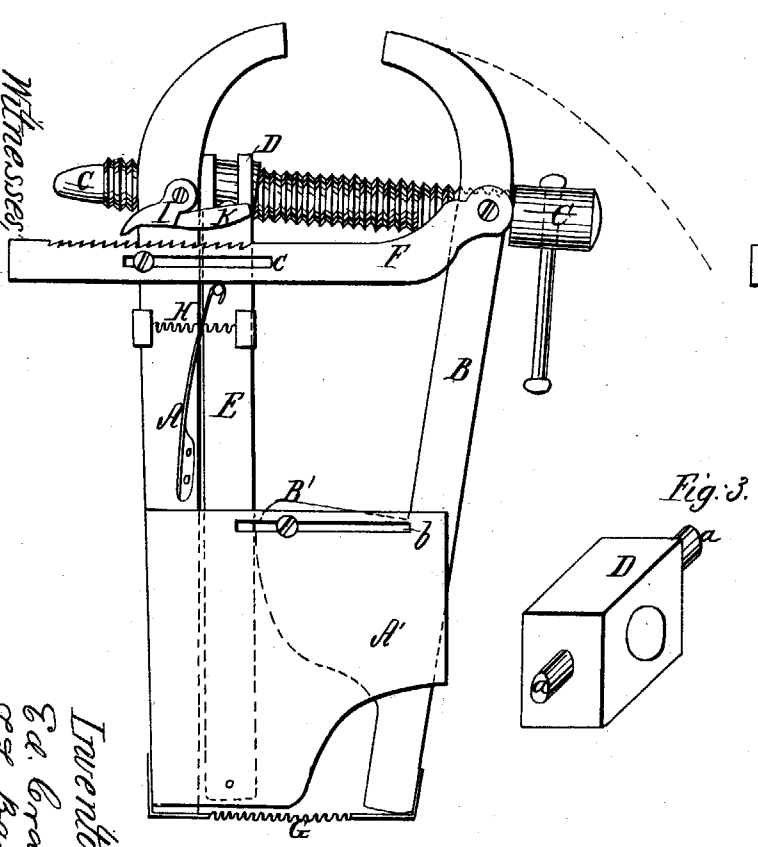
Witnesses,
W. McCagh
C. A. Clausen
Inventors,
Ed. Crawley
T. L. Baylies
D. P. Holloway & Co
Attys
N. PETERS, PHOTO-LITHOGRAPHER, WASHINGTON, D. C.

United States Patent Office.

EDWIN CRAWLEY AND THOMAS L. BAYLIES, OF RICHMOND, INDIANA.

*Letters Patent No.* 89,469, *dated April* 27, 1869; *reissue No.* 3,883, *dated March* 22, 1870.

IMPROVED VISE.

The Schedule referred to in these Letters Patent and making part of the same.

*To all whom it may concern:*

Be it known that we, EDWIN CRAWLEY and THOMAS L. BAYLIES, of Richmond, in the county of Wayne and State of Indiana, have invented a new and useful Improvement in Automatic Vises; and we do hereby declare that the following is a full, clear, and exact description of the same, reference being had to the annexed drawings making a part of this specification, in which—

Figure 1 is an elevation of our improved vise, showing the position the parts assume when the jaws are not pressing upon anything.

Figure 2 is an elevation showing the position the parts assume when the jaws are pressing an object which has been placed between them, or when they come in contact with each other.

Figure 3 is a perspective view of the nut through which the actuating screw passes.

Corresponding letters in the several figures represent corresponding parts.

This invention relates to an improvement in automatic vises, or that class of vises the moving jaw of which has a rapid motion when being adjusted with reference to the object to be secured therein, but which motion is automatically changed to a slower one, giving increased force when said jaw comes in contact with the thing to be held.

A in the drawings represents the back or fixed jaw of the vise, which is to be provided with the necessary projections by means of which it is secured to the bench.

In the accompanying example said jaw is provided with ears A′, which may be formed upon the jaw, or may be made separate and secured thereto by bolts or rivets.

A modification of the construction of jaw A may be made, by which the ears A′ are dispensed with, and in place thereof a projecting toe-piece is secured to the lower end of the jaw, to which the lever E is hinged.

B is the movable jaw, and is provided with a projection, B′, near its lower end, which fits between the ears A′, and is held in contact with lever E by the action of spring G. In the modification hereinbefore referred to the lower end of jaw B is hinged to the lever E at a point near the fulcrum of said lever.

The screw C is of ordinary construction, excepting that its threads are much coarser than those on screws ordinarily employed for such purposes, so that the jaw may have a more rapid motion when being adjusted than it does in ordinary vises. This arrangement is of great importance in vises of this construction, as it results in a considerable saving of time, inasmuch as, when the jaw is approaching to or receding from the article to be clamped, its movements will be rapid, and as the compressing force to be applied does not depend entirely upon the screw, but upon the action of a series of levers in combination therewith, it follows that any required compressing force can be applied by it. The head of screw C is supplied with the usual handle or lever for turning the same.

E represents a lever, which, when the jaws of the vise are not acting against any article between them, occupies a position parallel to the fixed jaw A, as shown in fig. 1, where it is held, in that case, by a spring, H, another form of the spring being shown at *m*. In this construction of the vise the lower end of lever E is situated between the ears A′, and is hinged to the lower side of said ears.

The upper end of lever E is bifurcated, and in this arrangement of parts a nut, D, is secured to the upper end of said lever, through which screw C passes, by means of which lever E is operated.

In order to accommodate nut D, as held by screw C, to different positions of lever E, said nut is supported on journals having their bearings in the bifurcations of lever E.

F represents an arm, which in the present case is pivoted on the side of movable jaw B, at a point nearly opposite the center of screw C, and extends in a line therewith to some distance beyond fixed jaw A.

Upon the upper edge of that portion of arm F which comes opposite jaw A, and for some distance each way therefrom, there are formed serrations or teeth which serve to receive the end of a pawl or dog, I, for a purpose hereinafter explained.

It will be observed that the arm F is provided with a slot, as shown at *c*, which is for the purpose of allowing it to travel back and forth with jaw B. A screw passes through said slot and into jaw A, for the purpose of retaining that end of said arm in position.

We have shown and described this bar or arm as attached to the sides of the jaws, but it is apparent that a slot may be formed through the jaws and through lever E, near its upper end, and this arm be passed through such slots and be made to operate therein, and that these slots may be located at any desired point beneath screw C. This modification will afford a more compact arrangement of the parts, and place them more completely out of the way.

The spring G, which is attached to the lower portions of the jaws, or to projections formed thereon, is for the purpose of acting on said jaws and separating their upper ends when the screw is turned outward.

A spring, H, shown in another form at *m*, is attached to jaw A and to lever E, which yields to the movement of lever E when the latter is drawn, by the action of the screw, away from the fixed jaw A, but which, when the screw is turned in the opposite direction, operates to draw said lever back to the position shown in fig. 1 of the drawings.

I represents a dog or pawl, which is pivoted to jaw

A at such a point as will permit its outer end to fall into and engage with the teeth formed upon the upper surface of arm F, for the purpose of forming for the time a fixed fulcrum for jaw B.

K represents a tripping-toe, which is attached to lever E, and is for the purpose of tripping the pawl I, it being so arranged with relation thereto that it serves to keep the pawl I from engaging with the teeth on arm F when the lever E and jaw A are together, and during the operation of adjusting the jaw.

The operation of our improved vise is as follows:

The parts being in the position shown in fig. 1 are ready for the reception of the article to be held, the pawl I being raised.

The screw C is turned in the proper direction, by which the moving jaw is made to approach the article to be held, and when it comes in contact therewith the continuation of the movement of the screw overcomes the resistance of the spring H or *m*, and the upper end of lever E recedes from jaw A, as a consequence of which the tripping-toe is withdrawn from pawl I, thus permitting said pawl to engage with the teeth on arm F, which has the effect to convert jaw B into a lever for the time, the fulcrum of which is at the point where arm F is pivoted to said jaw.

When jaw B has been converted into a lever, as, by the above-described movement of the parts, the said jaw is actuated by the pressure of lever E against projection B′, thus forcing outward the lower end of the jaw, which is supported and guided in its movements by a screw or pin on projection B′ working in a slot in the ears A′.

As a consequence of the above-described arrangement of lever E and what is now both lever and jaw B, a large increase of power is obtained for the further turning of screw C, as it is apparent that the distance from the fulcrum of lever E, or the point to which it is pivoted to jaw A, to the point at which said lever acts on jaw B, is less than the distance from the latter point to the point at which the power is applied, the pressure of lever E being applied to the long arm of lever or jaw B, the fulcrum of the latter, as before observed, being at the point where arm F is pivoted to it, thus giving to the vise a largely-increased power of compression over what could be obtained with the screw alone, while it possesses all the advantages of a rapidly-moving vise when being opened or closed.

Having thus described our invention,

What we claim and desire to secure by Letters Patent, is—

1. In combination with the jaw A a movable jaw, B, lever E, nut D, and screw C, so arranged that the movable jaw and lever shall form a compound lever, operated by the screw for the compression of an article placed between the jaws, substantially in the manner set forth.

2. In combination with said parts set forth in the first clause of claim, the bar F and pawl I, arranged to form an adjustable fulcrum for the jaw B, substantially as set forth.

3. The combination of the jaws A and B, screw C, lever E, and nut D, with an adjustable fulcrum and spring H, so arranged that the movable jaw shall be actuated by the screw in closing upon an article placed between the jaws, until the increased resistance, causing the spring to yield, brings into action the united compressing force of the screw and compound lever, substantially in the manner set forth.

4. The combination and arrangement of the jaws A and B, lever E, nut D, screw C, bar F, pawl I, and tripping-toe K, substantially as set forth.

5. The combination of the screw, the jaws, bar, pawl, and tripper, the pawl engaging the bar so as to convert the latter into a fulcrum on which the movable jaw may oscillate, substantially as set forth.

EDWIN CRAWLEY.
THOMAS L. BAYLIES.

Witnesses:
JOHN ELLIOTT,
STEPHEN WOODS.